March 11, 1958 L. S. WOOD 2,826,316
HYDRAULIC TAIL GATE MECHANISM WITH PRESSURE RETENTION MEANS
Filed Oct. 11, 1955 2 Sheets-Sheet 1

INVENTOR.
LOUIS S. WOOD
BY
ATTORNEYS

March 11, 1958          L. S. WOOD          2,826,316

HYDRAULIC TAIL GATE MECHANISM WITH PRESSURE RETENTION MEANS

Filed Oct. 11, 1955          2 Sheets-Sheet 2

— — — — to raise gate
— · — · — to lower gate
— — — — to close gate
———— to open gate

INVENTOR.
LOUIS S. WOOD
BY
ATTORNEYS

United States Patent Office 2,826,316
Patented Mar. 11, 1958

2,826,316

HYDRAULIC TAIL GATE MECHANISM WITH PRESSURE RETENTION MEANS

Louis S. Wood, Findlay, Ohio, assignor to The Perfection Steel Body Company, Galion, Ohio, a corporation of Ohio Application October 11, 1955, Serial No. 539,867

2 Claims. (Cl. 214—77)

This invention relates to power-operated mechanism for controlling the movement of a tailgate on a cargo-carrying vehicle, and more specifically to a fluid pressure operated mechanism having means for retaining an operative fluid pressure in the hydraulic system after power-actuation of the system has ceased.

It is a primary object of my invention to provide a fluid-operated tailgate mechanism in which pressure means are employed to maintain a positive closing force on the tailgate after the power actuation of the system is terminated.

Another object of my invention is to provide a tailgate mechanism of the character described with an improved gate closing mechanism.

Other objects and advantages of my invention will be apparent during the course of the following description.

In the accompanying drawings forming a part of this specification and in which like numerals are employed to designate like parts throughout the same, Fig. 1 is a side elevation of the rear portion of a cargo vehicle having a tailgate mechanism, embodying the features of my invention, mounted thereon.

Figure 1:
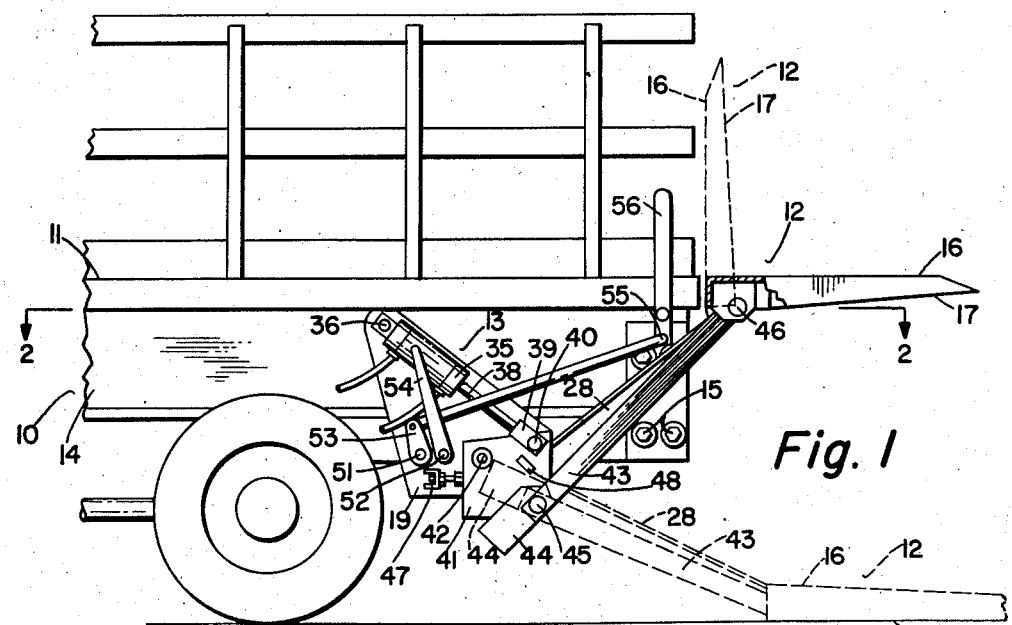
Figure 2:
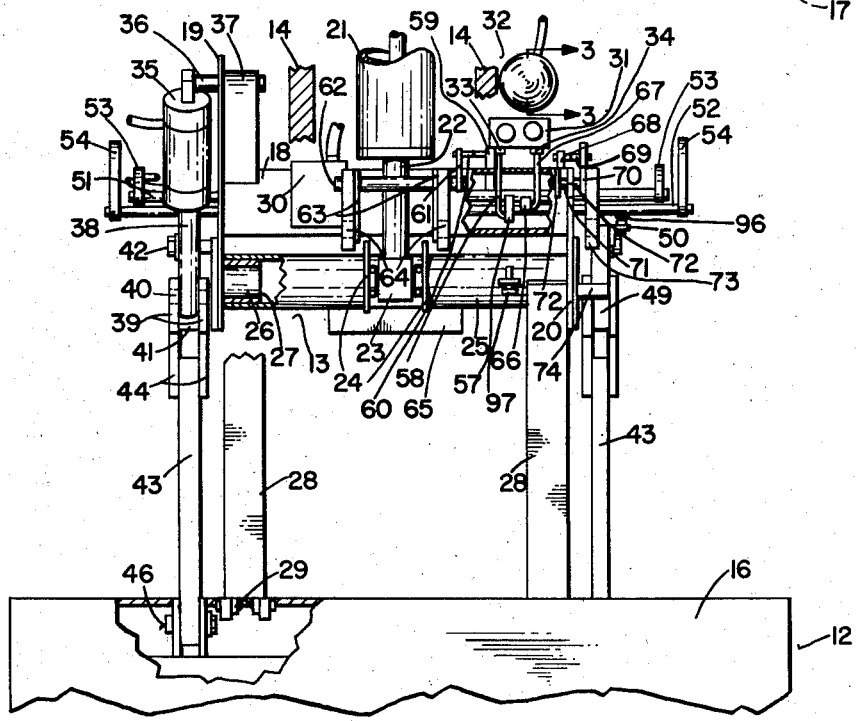
Fig. 2 is a plan view of the tailgate mechanism, taken as indicated on line 2—2 of Fig. 1, as it appears when the lifting arms are substantially horizontal, i. e., when the gate is intermediate the fully raised and fully lowered positions.
Figure 4:
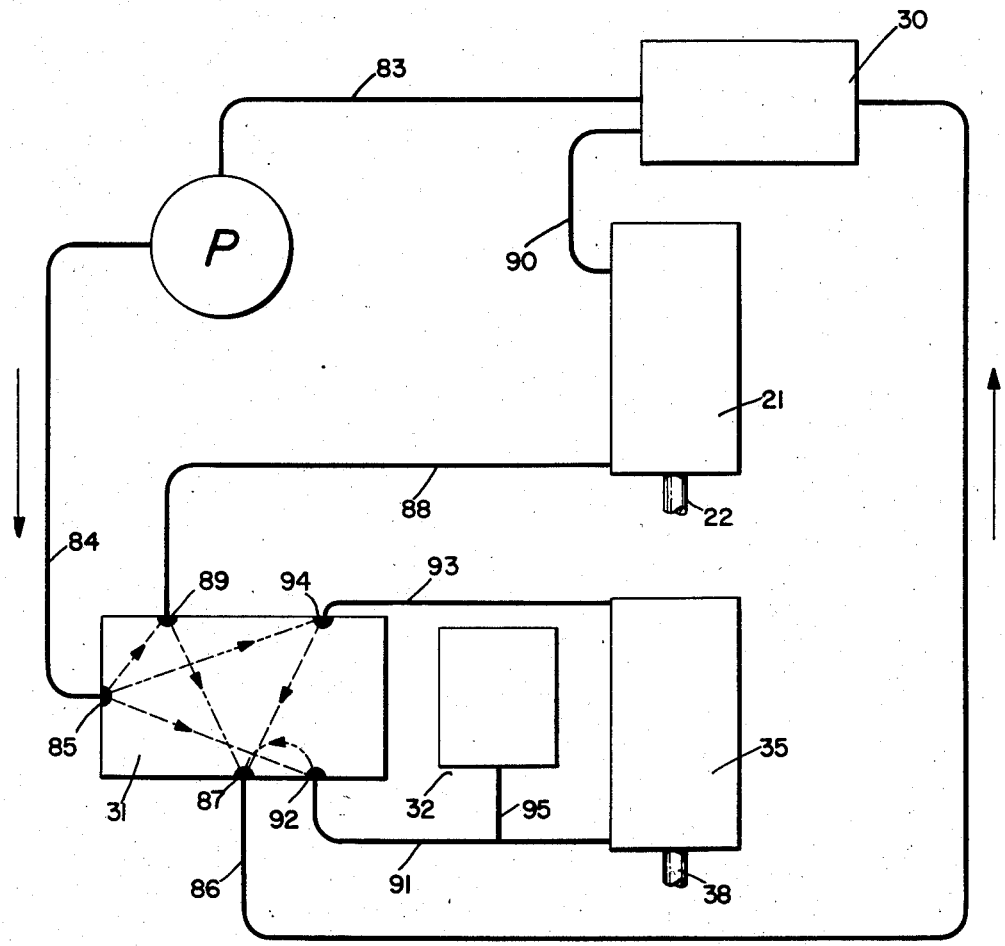
Fig. 4 is a diagrammatic representation of the hydraulic circuit employed in the mechanism.

Referring more particularly to Figs. 1 and 2 of the drawings, I have shown a truck body 10 having a bed 11. A tailgate 12 is movably associated with the body 10 by means of a power-operated mechanism 13 which is suitably secured to the underside of the body, as to the longitudinal sills 14, as indicated at 15.

The tailgate 12 has an interior or platform surface 16 and an opposite exterior or ground-engaging surface 17. The tailgate is adapted to be opened by rotation from the vertical plane, as shown in dotted outline in Fig. 1, to the solid line position in which the platform surface 16 is coplanar with the truck bed 11 and provides an extension thereof. The tailgate is also adapted to be lowered from the solid line position to the ground level position shown in dotted lines in Fig. 1. The mechanism 13 which is operatively connected to the tailgate 12 to effect the foregoing described movements, is also effective to raise the tailgate and close the tailgate in a reversal of movement.

The tailgate-operating mechanism 13 comprises a rigid frame structure, including a cross channel member 18 and end plates 19 and 20 which are fixedly secured to ends of the channel 18 in a plane normal to the longitudinal axis of the member 18. A fluid motor, in the form of a hydraulic elevating cylinder 21, is secured to a portion of the frame structure so as to be disposed centrally of the mechanism unit 13. A piston rod or ram 22 projects rearwardly of the cylinder 21 and terminates in a crosshead 23 which is pivotally connected to parallel crank arms 24 which are fixedly secured to a tubular shaft 25 whose longitudinal axis is normal to the direction of movement of the ram 22.

The shaft 25 is rotatably mounted on stub shafts 26 which are provided on end plates 19 and 20 and which project into sleeve bearings 27 in the ends of the tubular shaft 25. Fixedly secured to the shaft 25, as by welding, are a pair of parallel rearwardly-projecting lifting arms 28 the free ends of which are pivotally secured, as at 29, to horizontally spaced portions of the tailgate 12. As will be noted hereinafter, these pivot points 29 define the hinge point or pivotal axis about which the tailgate is rotated during its opening and closing movements.

The elevating cylinder 21 is one element of a hydraulic pressure system which includes a pump (not shown), a tank or reservoir 30 for the hydraulic fluid, a two-spool directional control valve 31 and a pressure accumulator 32. One spool 33 of valve 31 is utilized for control of the cylinder 21. The other spool 34 of the valve is utilized for control of a hydraulic closing cylinder 35 which is pivotally secured to the frame by means of a stub shaft 36 which traverses the end plate 19 and is rigidly secured thereto. The stub shaft 36 is additionally braced by means of a support member 37 which is welded to the shaft and to the top of channel member 18.

A piston rod or ram 38 projects downwardly and rearwardly from the cylinder 35 and the free end thereof is provided with a bifurcated arm 39 which is pivotally secured, as at 40, to a crankplate 41. The plate 41 is pivotally secured, as at 42, to the end plate 19 of the frame structure. An actuating bar 43 having a bifurcated end 44 is pivotally secured, as at 45, to the crankplate 41. The free end of the bar 43 is pivotally secured, as at 46, to the tailgate 12 at a point spaced rearwardly from the pivot point 29 of the lifting arms 28, thus providing a lever arm for rotating the tailgate about the axis defined by pivots 29.

An adjustable stop or abutment 47 is provided on the end plate 19 in the path of rotation of the crankplate 41 and another abutment 48 is provided on the crankplate 41 in the path of rotation of the end 44 of the actuating bar 43. The function of these abutments will become apparent as the description proceeds.

Another crankplate 49 is pivotally secured to the opposite side (the right side as viewed in Fig. 2) of the mechanism unit 13 for coaxial movement with the crankplate 41. The crankplate 49 also has an actuating bar 43 connecting it to the tailgate in the manner above described. The crankplate 49 is provided with an adjustable stop or abutment 50 whose function will be described hereinafter.

The operation of the mechanism is controlled by a transverse control rod 51 which is coordinated with the elevating cylinder 21, and a transverse control rod 52 which is coordinated with the closing cylinder 35. Both the rods 51 and 52 traverse the end plates 19 and 20 and are axially rotatable by means of levers or handles secured to the opposite ends thereof, so that the rods may be conveniently manipulated from either side of the truck body 10. The levers 53 are secured to the rod 51, and the levers 54 are secured to rod 52. As a matter of convenience, the levers 53 may be linked, as at 55, to a more accessible lever 56 which is pivotally secured to the truck body.

The control rod 51 is provided with a radial arm 57 which transmits linear motion to the valve spool 33 by means of a link 58 when the rod is rotated. The rod 51 is also provided with another radial arm 59 which, by means of a yieldable or lost-motion linkage 60 and arm 61, transmits rotation to a shaft 62 which is journalled in spaced frame uprights 63 and has rearwardly extending notched latch fingers 64 affixed thereto. The latch fingers 64 are disposed in the path of movement of a catch bar 65 which is mounted for rotation with the shaft 25.

The control rod 52 is provided with a radial arm 66 which transmits linear motion to the valve spool 34 by means of a link 67 when the rod is rotated. The rod 52 is also provided with another radial arm 68 which, by means of a yieldable or lost-motion linkage 69 and arm 70, transmits rotation to a shaft 71 which is journalled in spaced framed uprights 72 and has a rearwardly extending notched latch finger 73 affixed thereto. The latch finger 73 is disposed in the path of movement of a catch bar 74 which is mounted on the periphery of the crankplate 49 for rotation therewith.

Figure 3:
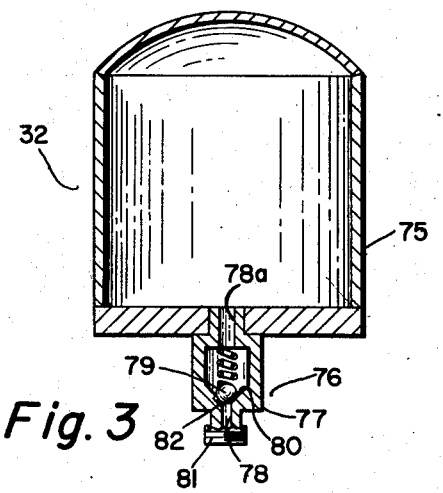
Fig. 3 is a cross-sectional view taken on line 3—3 of Fig. 2 and showing details of the accumulator structure.

As best seen in Fig. 3, the pressure accumulator 32 is a hollow body 75 in the base of which is secured a metering valve 76. The valve 76 may take various forms, but as here shown, it consists of a hollow valve body 77 having an inlet passage 78 and an outlet passage 78a. A spring-pressed ball 79 is disposed in a conical seat 80 adjacent the inlet passage 78. The body is provided adjacent the inlet with suitable connector means, such as the screw-threads 81, for permitting a hose to be coupled thereto. The ball 79 serves as a check valve which lifts from the seat 80 in response to pressure to permit fluid flow past the base into the hollow body 75. The ball seats to prevent counter-flow from the outlet passage 78a toward the inlet passage 78. However, for my purpose, I provide a small slot or groove 82 in the conical seat 80 which does serve to permit a slow rate of counter-flow of the fluid when the ball is seated.

By reference to the diagram of Fig. 5, it will be seen that the pump P has its intake or low pressure side connected by a conduit or hose 83 to the fluid reservoir 30, and has its high pressure or outlet side connected by a hose 84 to the inlet 85 of the two-spool directional control valve 31. Hydraulic fluid is directed under high pressure to the valve in the direction indicated by the arrow adjacent the hose 84. A hose 86 is connected to a return port 87 on the valve and serves to return the fluid to the reservoir 30.

The elevating cylinder 21 has its ram end connected by a hose 88 to a valve port 89, and has its other end connected to the reservoir 30 by a hose 90. The valve spool 33 controls the valve port 89.

The closing cylinder 35 has its ram end connected by a hose 91 to a valve port 92, and has its opposite end connected by a hose 93 to a valve port 94. The valve spool 34 controls the ports 92 and 94.

The accumulator 32 is connected by a hose 95 to the ram end of the cylinder 35.

Assuming that the tailgate 12 is in the upright closed position shown in dotted outline in Fig. 1, the operation of the mechanism will be as follows:

By means of a power take-off from the truck engine, the pump P is actuated. The valve spools 33 and 34 are normally in a neutral or holding position in which all the valve ports, except the return port 87, are blocked. The high pressure fluid thus is merely recirculated to the reservoir 30 when the valve spools are in the neutral position.

To open the gate, the handle 54 is pushed forwardly to rotate the control rod 52 in a counter-clockwise direction (as viewed in Fig. 1 or from the left side of Fig. 2). This movement causes the latch finger 73 to be lifted from locking engagement with the catch bar 74 and simultaneously causes valve spool 34 to be moved forwardly. Fluid is thereby directed from inlet 85 of valve 31 to valve port 94, through hose 93 to cylinder 35, causing piston rod 38 to advance. The displaced fluid in the ram end of the cylinder returns to the reservoir by means of hose 91, valve port 92 and return port 87.

As the ram 38 advances, it causes rotation of crankplate 41 about pivot point 42 and causes an arcuate movement of the pivotal connection 45 to the solid line position shown in Fig. 1. The bar 43 is thereby drawn forwardly to cause the gate 12 to be rotated about the pivotal axis 29 to the substantially horizontal position shown in solid lines in Fig. 1. The rotation of the crankplate 41 is arrested by its engagement with the stop 47 before the ram 38 reaches the limit of its stroke. As heretofore indicated, the stop 47 is adjustable to permit the open position of the gate 12 to be established at slight deviations from the horizontal, if desired. As the crankplate 41 approaches its limit of movement, the stop 50 on crankplate 49 engages a portion of an arm 96 which is secured to the control rod 52 in the path of movement of stop 50. This engagement causes the rod 52 to be rotated clockwise to its normal or neutral position, thus preventing any unnecessary pressure build-up in the cylinder 35. Upon completion of the gate-opening movement, the bars 43 and the lifting arms 28, and the associated pivotal linkage provide a parallelogram linkage for the raising and lowering of the gate.

To lower the gate 12, the handle 53 is pushed forwardly to rotate the control rod 51 in a counter-clockwise direction. This movement causes the latch fingers 64 to be lifted from locking engagement with the catch bar 65 and simultaneously causes valve spool 33 to be moved forwardly from its neutral position. This movement of spool 33 causes valve port 89 to be brought into communication with the return port 87 and permits the gate to be lowered by gravity while the fluid in the ram end of the cylinder 21 is displaced through hose 88 and fluid is drawn into the other end of the cylinder through hose 90 from reservoir 30. Due to the parallelogram linkage, the gate 12 will substantially maintain its horizontal position during the lowering operation, which is completed when the gate abuts the ground as shown in dotted outline in Fig. 1. It is to be noted that when the gate is at normal ground level, any inadvertent operation of closing cylinder 35 will result in a counter-clockwise rotation of the gate to a vertical position corresponding to the closed position. However, if there are ground irregularities or slopes rearwardly of the truck, it is possible that the gate would be lowered below normal ground level a sufficient distance to pass a critical point beyond which actuation of the closing cylinder would cause clockwise maloperation of the gate. In order to avoid such an occurrence, the stop 48 on crankplate 41 is so located as to limit the downward movement of the bar 43 and the gate 12 to a level which will arrest the lowering movement before the critical point is reached.

In its lowered position, the gate 12 is either loaded with cargo or unloaded, as the case may be, and is then returned to truck bed level by pulling handle 53 rearwardly to rotate rod 51 in a clockwise direction. This movement causes the latch fingers 64 to be lowered into the path of movement of the catch bar 65. Simultaneously, valve spool 33 is moved rearwardly and causes high pressure fluid to be directed from inlet 85 to valve port 89. The fluid enters the ram end of the cylinder 21 through hose 88 and causes retraction of the ram 22 which causes shaft 25 and lifting arms 28 to be rotated upwardly. The gate 12 is thereby raised to the solid line position shown in Fig. 1. As the gate approaches the bed-level position, the catch bar 65 cams the latch fingers 64 and is reengaged in locking position. At the same time, a spring-loaded arm 97 provided on shaft 25 engages the arm 57 on control rod 51 to rotate the control rod to a neutral position, thus stopping further hydraulic actuation of the elevating cylinder 21.

To close the gate, the handle 54 is pulled rearwardly to rotate the control rod 52 in a clockwise direction. This movement causes the latch finger 73 to be lowered into the path of movement of the catch bar 74 on crankplate 49. At the same time, the valve spool 34 is moved rearwardly. High pressure fluid is thereby directed into valve port 92 and through hose 91 into the ram end of closing cylinder 35. The displaced fluid in the other end of the cylinder returns to the reservoir through hose 93, valve port 94 and return port 87. The piston rod 38 is thereby retracted causing crankplate 41 to rotate the end of arm 43 upwardly with a corresponding closing movement of the gate to the vertical position. As the gate approaches the closing position, the latch finger 73 is cammed by the catch bar 74 to reengage the parts in locked relationship. At the same time, the stop 50 on crankplate 49 engages a portion of arm 96 to rotate the control rod 52 to the neutral position and thereby stop further hydraulic actuation of the cylinder 35.

It will be noted that during the gate-closing actuation of cylinder 35, the high pressure fluid is also directed into accumulator 32 through hose 91 and hose 95. The sealed body of air in the accumulator body 75 is thereby compressed during the closing operation. After the power actuation has ceased, the groove 82 in the metering valve 76 permits the stored pressure in the accumulator to be impressed on the ram end of the cylinder 35, thereby maintaining a continuous closing pressure on the gate 12 even after the hydraulic pump has ceased operating. This residual or retained pressure serves a dual purpose, (1) it provides a safeguard against accidental opening of the gate in the event there is a failure of the latch locking arrangement and (2) by keeping the gate under a positive closing pressure, it prevents the rattle and vibration which otherwise would occur during vehicle movement.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a power-operated tailgate assembly, the combination of a tailgate having a platform surface, a frame structure, a lifting arm pivotally connected to said tailgate and pivotally connected to said frame for movement about a horizontal axis, an actuating arm having one end thereof pivotally secured to said tailgate at a point spaced radially from the pivotal connection of said lifting arm and having the other end thereof pivotally and movably secured to said frame to define a selectively movable pivot point, power means, including a crankplate, for rotating said movable pivot point to a position wherein said lifting arm and said actuating arm are disposed in substantially parallel relationship, said rotation causing like opening rotation of said tailgate, means for controlling raising and lowering movement of said lifting arm, and an abutment provided on said frame in the path of movement of one of said arms to limit lowering movement of said tailgate to a predetermined critical level below which tailgate-closing rotation of said movable pivot point effects opening counter-rotation of said tailgate.

2. A combination as defined in claim 1 wherein said power means include a fluid motor, a hydraulic pressure circuit for energizing said fluid motor, and a pressure accumulator disposed in said fluid motor to maintain pressure thereon when said circuit is deenergized.

References Cited in the file of this patent

UNITED STATES PATENTS

| | | |
|---|---|---|
| 2,264,375 | Hill et al. | Dec. 2, 1941 |
| 2,576,881 | Kern | Nov. 27, 1951 |
| 2,593,240 | Anthony et al. | Apr. 15, 1952 |
| 2,596,895 | Frischmann | May 13, 1952 |
| 2,654,491 | Duis et al. | Oct. 6, 1953 |
| 2,719,637 | Wood | Oct. 4, 1955 |